… ……

United States Patent [19]

Onodera et al.

[11] Patent Number: 4,504,750

[45] Date of Patent: Mar. 12, 1985

[54] LINEAR MOTOR

[75] Inventors: Hiromi Onodera; Noriaki Wakabayashi, both of Hirakata; Kiichiro Yamada, Ibaraki; Yasushi Sugizaki, Neyagawa, all of Japan

[73] Assignee: Matsushita Electric Industrial Co., Ltd., Kadoma, Japan

[21] Appl. No.: 486,965

[22] Filed: Apr. 20, 1983

[30] Foreign Application Priority Data

Apr. 21, 1982 [JP] Japan ............................ 57-67575
Jul. 23, 1982 [JP] Japan ........................... 57-129338
Jul. 26, 1982 [JP] Japan ........................... 57-130672
Jul. 29, 1982 [JP] Japan ........................... 57-133432

[51] Int. Cl.³ ............................................ H02K 33/02
[52] U.S. Cl. ........................................ 310/12; 318/135
[58] Field of Search ................................ 310/12–14; 318/135

[56] References Cited

U.S. PATENT DOCUMENTS 3,867,676  2/1975  Chai et al. ......................... 318/135
3,869,625  3/1975  Sawyer .
3,999,107  12/1976  Reuting ............................ 310/12 X
4,075,539  2/1978  Wada ............................... 310/12 X
4,286,180  8/1981  Langley ............................ 310/12
4,370,577  1/1983  Wakabayashi et al. ............. 310/12

FOREIGN PATENT DOCUMENTS 2413419  10/1975  Fed. Rep. of Germany .
55-114177  9/1980  Japan .
55-117465  9/1980  Japan .
56-3570    1/1981  Japan .
56-83259   7/1981  Japan .

Primary Examiner—Donovan F. Duggan
Attorney, Agent, or Firm—Wenderoth, Lind & Ponack

[57] ABSTRACT

A linear motor comprising; a pair of iron cores with plural magnetic teeth groups in which phase is shifted 180 degrees in the direction of its movement, a movable element in which groups of magnetic teeth on the same iron core have the same phases, plural rows of magnetic teeth positioned crossing the direction of the movable element's movement at right angles and a fixed element in which mutual phase is shifted as much as n/m·P (m is the number of phases of the linear motor, n is an integer where m>n and P is the pitch of magnetic teeth).

11 Claims, 33 Drawing Figures

LINEAR MOTOR

BACKGROUND OF THE INVENTION

1. Field of the Invention

This invention relates to a linear motor in which a movable element shifts linearly.

2. Description of Prior Art

FIGS. 1A–1D show in diagrammatic form a prior art linear motor. In the parts of FIG. 1, a guiding member 1 is provided which is composed of magnetic material, and the movable element Z faces the guiding member across a minute gap to form a three phase linear motor here. Movable element 2 is composed of a pair of iron cores 21 and 22 with three field cores respectively, 211, 212, 213, 221, 222 and 223, permanent magnet 20 which is positioned between the pair of iron cores 21 and 22 to provide bias magnetic flux to said minute gap and three coils 31, 32 and 33 which are wound around adjacent field cores 211 and 221, 212 and 222, and 213 and 223 of the pair of iron cores 21 and 22. Three magnetic teeth a, b and c which have the same pitch as pitch P for magnetic teeth on guiding member 1 are provided on the ends of field cores 211, 212, 213 and 221, 222 and 223 which face corresponding rows of teeth 11 and 12 on guiding member 1. The positions of the teeth on the respective field cores 211, 212 and 213 (221, 222 and 223) which are on the same iron core are shifted from the teeth on adjacent field core by $(N \pm n/m)P$ where N is an integer, m is the number of phases of the linear motor, n is an integer, $m > n$, and which is $(5 + \frac{1}{3})P$ in this example). As shown in FIG. 1 (C), magnetic teeth on adjacent field cores of iron cores 21 and 22 have the same phase positions. As shown in FIG. 1 (D), guiding member 1 has rows of magnetic teeth 11 and 12 which are at the same pitch P as magnetic teeth on iron cores 21 and 22 of movable element 2. Rows of magnetic teeth 11 and 12 are shifted as much as $\frac{1}{2}P$ in the direction of movement of said movable element 2. In a device which has an above construction, said permanent magnet 20 is magnetized in the direction as shown in FIG. 1 (B) and magnetic flux generated by said permanent magnet 20 returns to permanent magnet 20 through field cores 211, 212 and 213 of iron core 21, the row of magnetic teeth 11 which faces magnetic teeth a, b and c across a minute gap, the row of magnetic teeth 12, across the minute gap, the magnetic teeth on each field core 221, 222 and 223 of core 22, and the respective field cores 221, 222 and 223. That means there is bias magnetic flux in the gap between the teeth on said movable element 2 and the teeth on and guiding member 1. When exciting current is line overlapped with said bias magnetic flux.

When exciting current is conducted to coil 31 in the direction in which magnetic flux between field core 211 on the iron core 21 side and guiding member 1 is increased, magnetic flux between field core 221 on the iron core 22 side and guiding member 1 is reduced. As a result, field core 21 on movable element 2 is pulled along member 1 toward the position shown in FIG. 1A in which the gap reactance is minimized.

Then, when exciting current is conducted to coil 32 in the direction in which magnetic flux between field core 212 on the iron core 21 side and guiding path 1 is increased, field core 212 is pulled along guiding member 1 and thus movable element 2 shifts to the right. Movable element 2 shifts as much as $\frac{1}{3}P$, as the magnetic teeth a, b and c on field core 212 shift as much as $\frac{1}{3}P$. In the same manner, when exciting current is conducted to coils 33, 31, 32, 33, . . . respectively, the moveable element shifts to the right respectively with a minimum shifting length of $\frac{1}{3}P$. When exciting current is conducted to coils 33, 32 and 31 respectively, movable element 2 shifts to the left.

On the other hand, if the direction of exciting current conducted to coils 31, 32 and 33 is reversed from said case, magnetic flux between field core 221 and guiding member 1 is increased and movable element is pulled along guiding member 1. Therefore, when exciting current is respectively conducted to coil 32, 33, 31 . . . , in the reverse direction from said case, movable element 2 shifts to the right with $\frac{1}{3}P$ as a minimum shifting length. Also, when current is conducted to coils 33, 32, 31, . . . respectively in the reverse direction from said case, movable element 2 shifts to the left with $\frac{1}{3}P$ as a minimum a minimum shifting length. As rows of magnetic teeth 11 and 12 on guiding element 1 have the teeth shifted as much as $\frac{1}{2}P$, when the direction of exciting current conducted to the coils is positive and negative (reversed stopping position of movable element 2 are not overlapped with each other and are shifted as much as 1/6P.) That is, movable element 2 shifts as much as a minimum shifting length 1/6P by switching exciting current to be conducted to coils 21, 32 and 33 and changing the direction of exciting current to energize the coils respectively. Thus explanation is given only in terms of single phase energizing, but thrust force can be increased by providing polyphase energizing.

To improve the thrust force of this type of linear motor, it is very effective to increase bias magnetic flux between magnetic teeth on the movable element iron cores and those on the guiding element. One means to expand bias magnetic flux is to increase the total magnetic flux generated by the permanent magnet which provides bias magnetic flux. Another mean is try to minimize leakage flux which does not contribute to the linear motor thrust force by the magnetic flux generated by the permanent magnet.

In the prior art motor which has the construction as shown in FIG. 1 small distance $W_1$ between adjacent field cores 211 and 221, 212 and 222, and 213 and 223 of iron cores 21 and 22 causes increased leakage flux between them and it is the largest proportion of leakage flux in the entire magnetic circuit. Therefore, the magnetic flux of the permanent magnet is not used effectively and there is a lot of waste, and thus the motor's operation is not very efficient.

If said distance $W_1$ is increased, it is possible to reduce leakage magnetic flux, but width $W_2$ of guiding member 1 must also be expanded accordingly. Expansion of width $W_2$ of guiding member 1 must be along the entire length of guiding member 1, and the weight of the guiding member increases greatly. Due to this increase, the weight of the device into which the motor is integrated naturally increases. Also, for an X-Y plotter into which the motor is integrated, the weight increase of the guiding member causes an adverse effect on the velocity of plotting, because the motor of one spindle carries out shift positioning of the motor of another spindle with its guiding member. Movable element magnetic teeth of the prior art motor as shown in FIG. 1 are difficult to machined precisely to an accurate dimension. Generally, movable element magnetic teeth are machined by feeding a machining knife at the magnetic teeth pitch. When the number of linear motor phases is increased to 5, 6, . . . , the magnetic teeth for the different phases on the same iron core is increased to 5, 6, . . . and their pitch differences become 2π/5 and 2π/6, . . . , so that the feeding pitch of the machining knife must be changed many times during machining, and therefore the machining cannot be carried out precisely.

As a result the linear motor is difficult to make with precision. Also, the thrust force for shifting generated in each field core is actually very uneven in this type of linear motor. The biggest reason for this is that the amount of bias magnetic flux which passes each field core is very different. This difference stems from magnetic non-contrast and most of it is caused by leakage flux. FIG. 2 is a perspective view of movable element 2 to explain leakage magnetic flux of the prior art motor shown in FIG. 1. Half cylinder parts 81 and 82 shown in dotted lines show the leakage flux path in which bias magnetic flux is leaked on both sides of a pair of iron cores 21 and 22. This kind of leakage path is for the level of bias magnetic flux which passes through each field core. That is, compared with bias magnetic flux which passes through central field cores 212 and 222, bias magnetic flux which passes through field cores 211, 221, 213 and 223 which are positioned outside of 212 and 222 is smaller.

In addition to that, the magnetic flux of the coils are different depending on each field core. This is mainly due to the difference of magnetic resistance depending on the length of the iron core magnetic path. For instance, in the case of iron core 21, magnetic flux generated by coil 32 which is wound around field core 212 at the center of iron core 21 separately goes around field core 211 and 213 on the both sides of coil 32, but magnetic flux, for instance, of coil 31 wound around outside field core 211, goes around field core 212 which is next to 211, and, further, field core 213 which is next to 212. Thus, in the latter case, the magnetic path is slightly longer and the magnetic flux in the outside field cores tends to be slightly smaller than that of the central field cores. It is becoming apparent that deviation of thrust force caused by each field core is mainly affected by two kinds of deviation, deviation of bias magnetic flux and magnetic flux caused by coils. Deviation of magnetic flux caused by coils can be made almost negligible by lowering the iron core reluctance, but deviation of bias magnetic flux is relatively large and, as a consequence, the linear motor thrust force of the prior art motor deviates to a large extent.

SUMMARY OF THE INVENTION

This invention seeks to provide a novel linear motor in which defects of the prior art motors are eliminated.

Thus an object of the invention is to provide a linear motor with high efficiency, high performance and a large thrust force.

Another object of the invention is to provide a linear motor which is constructed so that machining of magnetic teeth and precision can be easily improved.

A further object of the invention is to provide a smooth and high grade linear motor which has an even thrust force for shifting generated by each field core.

These objects and features of the invention can be understood more clearly by the following detailed description taken in connection with the accompanying drawings.

DETAILED DESCRIPTION OF THE PREFERRED EMBODIMENTS

Figure 1A:
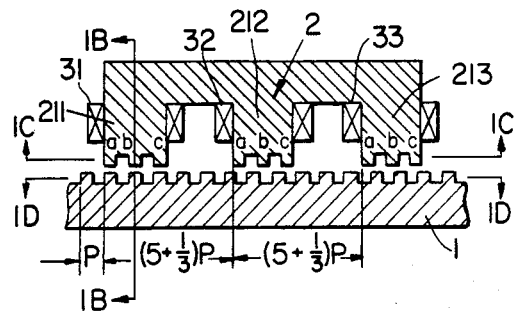
FIGS. 1A-1D are sectional views, on section lines 1A—1A, 1B—1B, 1C—1C and 1D—1D of the respective figures of an example of a prior art linear motor prior art.
Figure 1B:
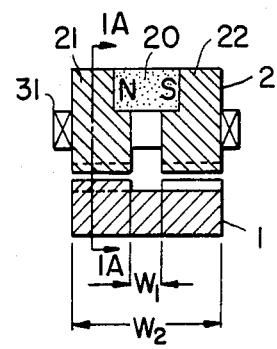
Figure 1C:
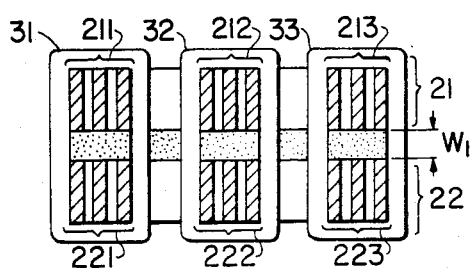
Figure 1D:
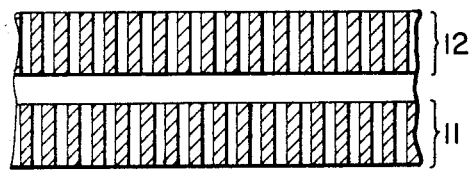
Figure 2:
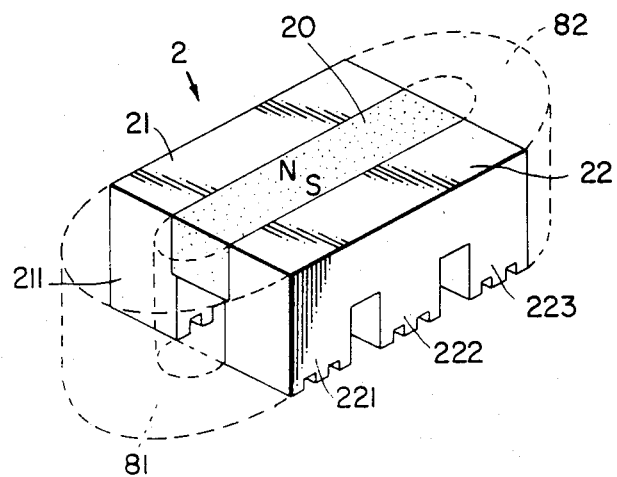
FIG. 2 is a perspective view of the movable part of the motor of FIG. 1 to describe leakage magnetic flux thereof.

In the parts of FIG. 3, guiding element 4 is similar to that of the prior art of FIG. 1D, but has three rows of teeth, and movable element 5 is composed of a pair of iron cores 51 and 52 spaced in the direction of the length of guide member 4, i.e. the longitudinal direction, and each having plural field cores (in this embodiment, the field cores 511, 512, and 513, and field cores 521, 522 and 523), permanent magnet 50 which is connected between the pair of iron cores 51 and 52 to provide bias magnetic flux, and plural coils (61, 62 and 63 here) wound around corresponding pairs of field cores 511 and 521, 512 and 522, and 513 and 523 on the pair of iron cores 51 and 52.

Plural magnetic teeth at pitch P are formed on the faces of the field cores which face the guiding member 4. As for the relationship of the pitches of the teeth, teeth on field cores 511, 512 and 513 on iron core 51 are shown in FIG. 3C. Teeth of adjacent field cores 521, 522, and 523 are, when the teeth on field cores 511, 512 and 513 are opposed to teeth on guiding member 4, shifted so as to be offset from opposed teeth or guiding member 4 by as much as ½P. Guiding member 4 is composed of magnetic materials and plural teeth with the same pitch P as that of the teeth on movable element 5 are on the surface which faces the teeth on said movable element 5. Plural rows of teeth are present extending in the longitudinal direction of guiding element 4 (in this embodiment, three rows: 41, 42 and 43). As for the relationship between rows of teeth 41, 42 and 43, the teeth in the rows are shifted as much as n/m·p in the longitudinal direction relative to teeth in the adjacent rows (m is th number of phases of the linear motor and n is an integer and the relationship is m>n). In this embodiment, the teeth in rows of teeth 41 and 42, and 43, and 43 and 41 are offset by as much as ⅓P.

Figure 3A:
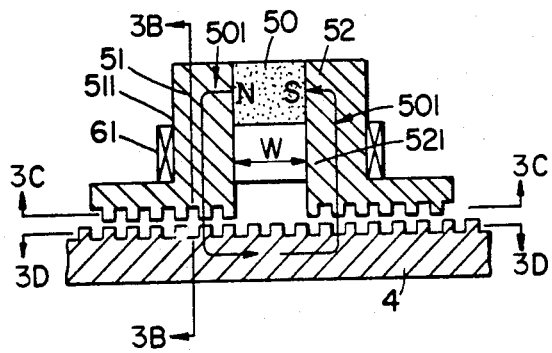
FIGS. 3A-3D are sectional views on section lines 3A—3A, 3B—3B, 3C—3C and 3D—3D of the respective figures of one embodiment of a linear motor according to the invention.
Figure 3B:
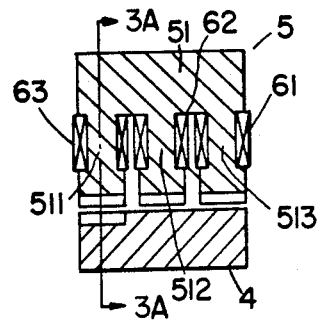
Figure 3C:
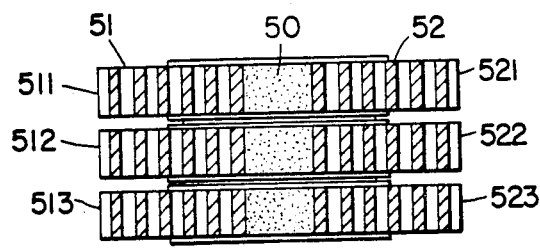
Figure 3D:
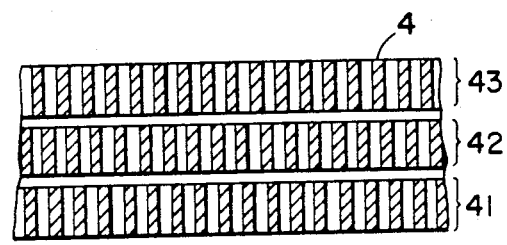

In the linear motor with such a construction, if permanent magnet 50 is magnetized in the direction as shown in FIG. 3(A), magnetic flux is generated between movable element 5 and guiding member 4 in the direction as shown by 501 of the same Figure. That is, there is bias magnetic flux in the direction towards iron core 51, and guiding member 4 and iron core 52. When exciting current is conducted to coil 61 wound around field cores 511 and 521, magnetic flux generated by this exciting current is superimposed on the bias magnetic flux, magnetic flux increases between field core 511 and the row of teeth in row 41 on guiding member 4 and magnetic flux decreases between field core 521 and the row of teeth of guiding member 4. As a result, field core 511 is pulled along the teeth on guiding member 4 by the magnetic flux. Movable element 5 is held in the position as shown in FIG. 3(A). Then, when exciting current is conducted to coils wound around field cores 512 and 522, magnetic flux increases between field core 512 and the teeth in the row of teeth 42 and movable element 5 is pulled along guiding member 4 to the right. Movable element 5 shifts as much as ⅓P, since the teeth in rows 41 and 42 on the guiding member are offset as much as ⅓P in the longtudinal direction. In the same manner, when exciting current is conducted to coils 63, 61, 62, 63, . . . respectively, movable element 5 shifts to the right respectively with ⅓·P as a minimum shifting length. When exciting current is conducted to coils 63, 62, 61, . . . respectively, movable element 5 shifts to the left. On the other hand, when the direction of exciting current in the coils 61, 62 and 63, is reversed from the said case, magnetic flux increases between field cores 521, 522 and 523 and rows 41, 42 and 43 of teeth and the field cores are pulled along guiding member. Thus when exciting current is conducted to coils 61, 62, 63 . . . in the reversed direction from the said case, movable element 5 shifts to the right with ⅓P as a minimum shifting length. Also, current can be conducted to coils 63, 62, 61, . . . respectively in the reverse direction from the said case. As teeth on the field cores 511 and 521, 512 and 522 and 513 and 523 are offset as much as ½·P in the longitudinal direction of guide member 5 when the direction of exciting current conducted to the coils is positive and negative (reverse direction), stopping positions of movable element 5 are not overlapped and shifted as much as 1/6P. That is, movable element 5 shifts with 1/6P as a minimum shifting length by switching exciting current conducted to coils 61, 62 and 63 and changing the direction of exciting current to magnetize coils respectively. A description is given only of single phase energizing so far, but needless to say polyphase energizing can increase thrust force inthe same manner as the prior art motor of FIG. 1.

The structural features of the linear motor of the invention will now be described.

In FIG. 3, the distance between the pair of iron cores 51 and 52 can be increased. Leakage magnetic flux from the field cores of iron core 51 to field cores of iron core 52 can be greatly reduced by increasing distance W. Thus, magnetic flux generated by permanent magnet 50 can be effectively used. This increases bias magnetic flux and contributes to improving thrust force. When the device has such a construction, the width of the guiding member is not changed and its weight is hardly affected.

In the linear motor of the invention, although the width of magnetic teeth is reduced, areas of the teeth on the pair of iron cores 51 and 52 of the movable element and the teeth on the guiding member can be designed at will, and the number of teeth can be easily increased in the longitudinal direction of the guide member. Therefore, it is easy to avoid magnetic saturation caused by excessive bias magnetic flux. Also, there is almost no increase in the weight of the guiding member, because the width of the guiding member does not change at all even when the number of movable element teeth is increased in the longitudinal direction.

As explained, the linear motor of the invention can increase thrust force, thus improving efficiency, and this does not increase the weight of the guiding member.

According to a model made by the inventor, it has been confirmed that where the linear motor of the invention has the equivalent width and weight to that of a guiding member of a prior art motor and almost the equivalent size and weight of the movable element of the prior art motor, and thrust force is increased by 30%~40%. Therefore, it can be said that the linear motor of the invention is most suitable for an X-Y plotter, as mentioned before.

Further, the construction of the movable element 5 of the linear motor of the invention is very advantageous in terms of overcoming the defects of prior art motors with respect to the diffuculty of precisely machining the element teeth on the movable element. That is, on plural field cores of movable element 5, the position of each tooth on the field cores of the same iron core is aligned with the teeth on the other field cores. Thus, no matter how much the number of phases increases, there is only one kind of teeth on the same iron core and therefore, it is necessary to change the feeding pitch of the machining knife only when changing the distance ½·P for a pair of iron cores. Therefore, the construction of the movable elment of the linear motor of the invention is very simple and the precision of machining of teeth can be easily improved. In the above description, the operation of the linear motor of the invention is described as a step motor, but it does not reduce the advantages of the invention even when position detecting means, non-contact current feeding means and so on are provided so that it becomes an electronic commutator linear motor.

In the embodiment of FIG. 3, permanent magnet 50 is positioned between a pair of iron cores 51 and 52 to provide bias magnetic flux.

Figure 4:
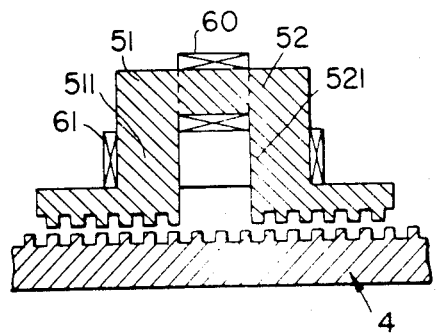
FIG. 4 and FIG. 5 are sectional views similar to FIG. 3A of the major parts of other embodiments of linear motor according to the invention.

It is also possible to provide bias magnetic flux by winding coil 60 around the magnetic path between iron cores 51 and 52, as shown in FIG. 4.

Figure 5:
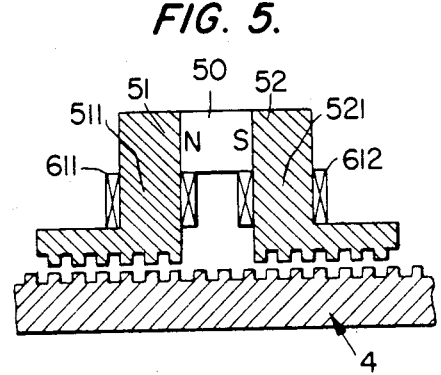

As for coils 61, 62 and 63, which are wound between pairs of field cores 511 and 521, the can be replaced by coils 611 and 612 wound around field cores 511 and 521 respectively as shown if FIG. 5 and connected is series or which have exciting current conducted to them separately. Similar separate coils can be provided for pairs of field cores 512 and 522 and 513 and 523.

When the distance between a pair of iron cores 51 and 52 is extremely large and coils are wound between a pair of field cores 511 and 521 (512 and 522, 513 and 523), the length of the coils is increased and ohmic loss increases. From the standpoint of linear motor efficiency, it is desirable that ohmic loss be as small as possible.

Figure 6A:
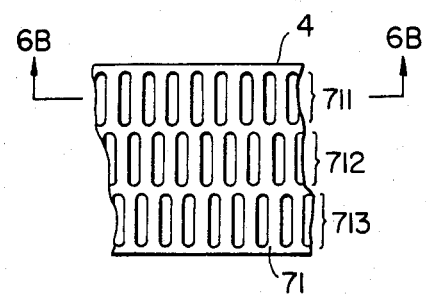
FIGS. 6 A and B are a plan view and a sectional view of an embodiments of a guiding member which can be used for the linear motor of the invention.
Figure 6B:
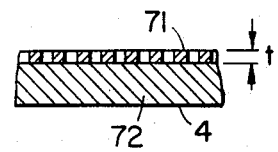
Figure 7A:
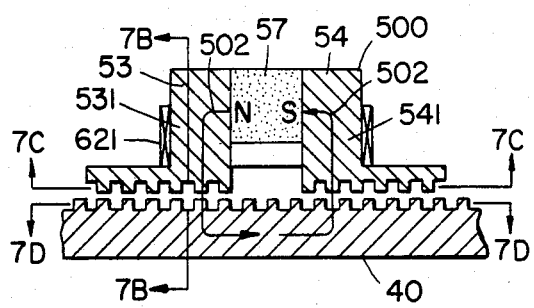
FIGS. 7A-7D are sectional views on lines 7A—7A to 7D—7D of the respective figures of a further embodiment of the linear motor of the invention.
Figure 7B:
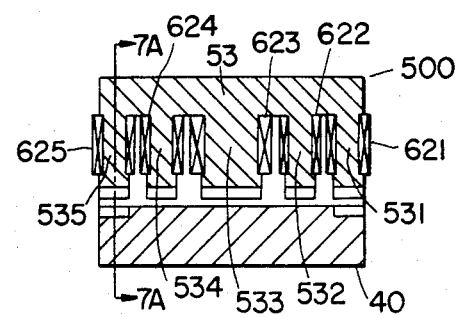
Figure 7C:
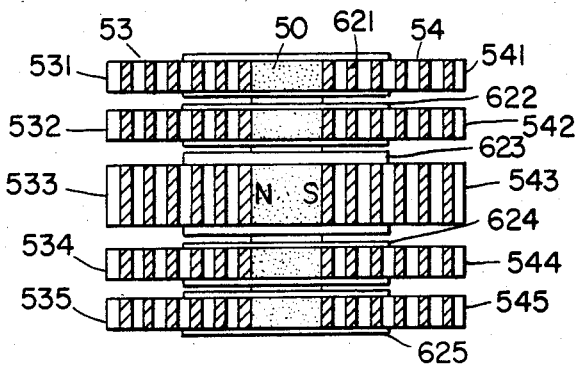
Figure 7D:
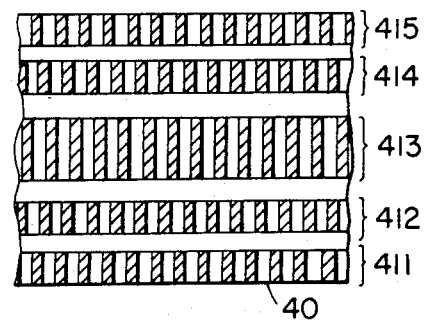

The embodiment of FIG. 5 is very effective to reduce ohmic loss as the length of the coils can be shortened. FIG. 6 is an embodiment of the construction of the guide member which can be made easily and with good precision and which can be used with the embodiments of the invention in FIG. 3, FIG. 4 and FIG. 5.

In FIG. 6, laminated material 71 (hereafter referred to as an etched lamination) made of magnetic material and having plural slits made by etching is fixed to substrate 72 made of magnetic material to form the equivalent of teeth in rows 41, 42 and 43 on guiding member 4. Plural rows (in this embodiment, three rows: 711, 712 and 713) of slits in etched lamination 71 are formed extending in the longitudinal direction of guiding member 4. The positions of slits in rows 711, 712 and 713 are shifted as much as n/m·P in the longitudinal direction from the positions of slits in adjacent rows (where m is the number of phases of the linear motor and n is interger, m>n) and they are shifted as much as ½·P relative to each other in the embodiment.

The precision of the dimension of the slits in the etched lamination 71 depends on the precision of etching, which in turn is determined by the quality of the laminated material and the thickness t. Therefore, even when the row of teeth of guiding member 4 is increased to 5 rows, 6 rows, ... and becomes complicated, as the number of phases of the linear motor increases to 5, 6, ..., the difficulty of the production of the lamination is not affected, precision does not deteriorate and production can be carried out very easily. The slits in the etched lamination penetrate through the lamination material, but there is no doubt that half etching is acceptable, and it has the same advantages from the standpoint of precision and easy production.

Although it is not shown in figures, said advantages are not reduced at all even when substrate 72 made of magnetic material is etghed to provide recesses corresponding to the slits, and etched lamination 71 is omitted In FIGS. 7A-7D, movable element 500 is composed of a pair of iro cores 53 and 54 with a number of field cores equal to $2m-j$ and $m-2 \geq j \geq o$ (in this embodiment, $m=3$, $j=1$ and there are five field cores 531, 532, 533, 534 and 535 in iron core 3 and five field cores 541, 542, 543, 544 and 545 in field core 54), permanent magnet 57 which is positioned between these iron cores to provide bias magnetic flux and plural coils, five here, 621, 622, 623, 624 and 625, wound between adjacent field cores 531 and 541, 532 and 542, 533 and 543, 534 and 544, and 535 and 545 of the pair of iron cores. Teeth groups wiht pitch P are formed on the surface of each field core which faces the member. As for the relationship of the teeth, the teeth on field cores 531, 532, 533, 534 and 535 are at the same pitch P and are aligned transversely of the guiding member, and the teeth of field cores 541, 542, 543, 544 and 545 are at the same pitch P and are aligned transversely. The teeth on field cores, 541, 542, 543, 544, and 545 are shifted from the teeth on field cores 531-535 in the longitudinal direction as much as ½·P. The teeth on field cores 531, 532, 534, 535, 541, 542, 544 and 545 have the same area S1, and the teeth on field cores 533 and 543 have the same area S2, S2 being twice as large as S1. Coils 621, 622, 624 and 625 which are wound around field cores 531 and 541, 532, and 542, 534 and 544, and 535 and 545 have the same number of turns($N_1$). The number of turns of coil 623 wound around field cores 533 and 543 is $N_2$, $N_2$ being twice $N_1$. Further, coils 621 and 625 and coils 622 and 624 are respectively in series or parallel to conduct exciting currents simultaneously to coils 621 and 625 and to coils 622 and 624. Guiding member 40 is made of magnetic material and has plural teeth at the same pitch P as the teeth on the field cores on movable member 50 and are formed on a surface which faces the teeth on said movable element 500. There are plural rows (in this embodiment, five rows: 411, 412, 413, 414, 415) of teeth on said guiding member 40 extending in longitudinal direction of said guiding member 40. As for the relationship of the positions of the teeth in these rows of teeth, the teeth in rows 411 and 415 are aligned laterally of member 40 and the teeth in rows 412 and 414 are aligned laterally and shifted as much as n/m ·P in the longitudinal direction (n is the number of phases of the linear motor and m is an integer where relationship is m>n) and, in this embodiment, the teeth are shifted as much as ⅓·P. The teeth in row 413 are shifted ⅙·P relative to the teeth in rows 412 and 414. That is, the linear motor of this embodiment of the invention in FIG. 7 is a three phase motor. Considering the relationship of the positions of the teeth on each field core 531, 532, 533, 534, 535, 541, 541, 543, 544 and 545 of movable element 500 to the rows of teeth on guiding member 40, when teeth on field cores 531 and 535 are opposed to teeth in rows 411 and 415, the teeth in all other rows and all othe opposed field cores are offset. As described, if permanent magnet 57 is magnetized in the direction as shown in FIG. 7 (A) in the linear motor, magnetic flux is generated in the direction as shown in 502 of the same Fig. between movable element 500 and guiding member 40. That means there is bias magnetic flux through iron core 53, guiding member 40 and iron core 54. When exciting current is conducted to coils 621 and 625 which are wound around field cores 531 and 541 and around coils 535 and 545, magnetic flux generated by this exciting current is superimposed on the bias magnetic flux between field cores 531 and 535 and the rows of teeth 411 and 415 on guide member 40 is increased and magnetic flux between field cores 541 and 545 and rows of magnetic teeth in rows 411 and 415 decreases. As a result, the field cores 531 and 535 are pulled toward the teeth in rows of magnetic teeth 411 and 415 and movable element 500 is moved to the position as shown in FIG. 7 (A) in which reluctance of the gap is minimized. Then, when exciting current is conducted to coils which are wound around field cores 532 and 542, and 534 and 544, magnetic flux between field cores 532 and 534 and teeth in rows 412 and 414 increases movable element 500 shifts to the right. Movable element 500 shifts as much as ⅓P, as rows of teeth 411 and 415, and 412 and 414 on the guiding member are transversely aligned and the teeth in rows 411 and 412 are offset as much as ⅓P in the longitudinal direction of the guide member 40. In the same manner, when exciting current is conducted to coils 623 and 621 and 625 and 622 and 624, 623 ... respectively, movable element 500 shifts to the right respectively with ⅙P as a minimum shifting length.

When exciting current is conducted to coils 623 and 622 and 624, 621 and 625, ..., respectively, movable element 500 shifts to the left.

On the other hand, when the direction of exciting current conducted to coils 621, 622, 623, 624, 625 is reversed from the foregoing case, magnetic flux between field cores 541, 542, 543, 544 and 545 and the teeth in the rows of magnetic teeth 411, 412, 413, 414 and 415 increases. Therefore, when exciting current is conducted in the reverse direction from the foregoing, to coils 621 and 625, 622 and 624, 623, ..., movable element 500 also shifts to the right with ⅙P as a minimum shifting length. When current is conducted in the reverse direction from this case, to coils 623, 622 and 624, 621 and 625, ... respectively, movable element 500 shifts to the left with ⅓P as a minimum shifting length. The field cores 531 and 541, 532 and 542, 533 and 543, 534 and 544, 535 and 545 are offset as much as ½P in the longitudinal direction and when the direction of exciting current conducted to the coils is positive and negative (reverse direction), the stopping positions of movable element 500 are not overlapped and are shifted as much as 1/6P. Movable element 500 shifts with 1/6P as a minimum shifting length upon a change in the direction of exciting current to magnetize the respective coils.

An explanation is given only for single energizing in the above description, but needless to say polyphase energizing can increase the thrust force in the same manner as in the prior art in FIG. 1.

The linear motor of the invention has the following superior features.

In FIG. 7, teeth are provided which are transversely aligned and which generate thrust force simultaneously on the left and right sides, relative to the longitudinal direction of the guiding member 40, of the center of gravity of the movable element 500 in cooperation with the teeth on the guiding member. The distances of the teeth in the separate rows from the center of gravity are the same. Thus, the thrust force generated in each row of teeth can effectively work to move the movable member in the forwarding direction without giving rotation moment to movable element 500 and, thus, smooth operation can be achieved.

Therefore, this linear motor is suitable especially when a large thrust force and smooth operation are required and there is no limit on the width of the guiding member.

It can used as a step motor for positioning equipment for which high precision is required even though it is small in size and requires only a small thrust force, and it can be used as a servomotor for equipment for which smooth movements are required. Further, in terms of production, the linear motor can be polyphased easily. There is only transversely aligned teeth on each iron core 53 and 54 of movable element 500 and the feeding pitch of a machining knife need be changed only when changing the distance ½P in a pair of iron cores as the first embodiment of the invention in FIG. 3, and thus, teeth with extremely high precision can be formed and making the motor polyphase does not cause deteroration of the precision. There is no doubt that when the rows of teeth on guiding member are formed by a method such as etching, etc., the level of work and precision of machining are not changed and the guiding member can be produced easily no matter how many rows are formed. In the embodiment of the invention in FIG. 7, the construction in which two field cores 533 and 543 are provided which are a different size from the other field cores 531, 532, 534, 535, 541, 542, 544 and 545 does not reduce the advantages of the invention. Coils 621, 622, 623, 624, 625 are wound around pairs of field cores 531 and 541, 532 and 542, 533 and 543, 534 and 544, 535 and 545 respectively but they can be separately wound around each field core and connected in series. Also, needless to say coils can be used as means to provide bias magnetic flux instead of the permanent magnet.

Figure 8:
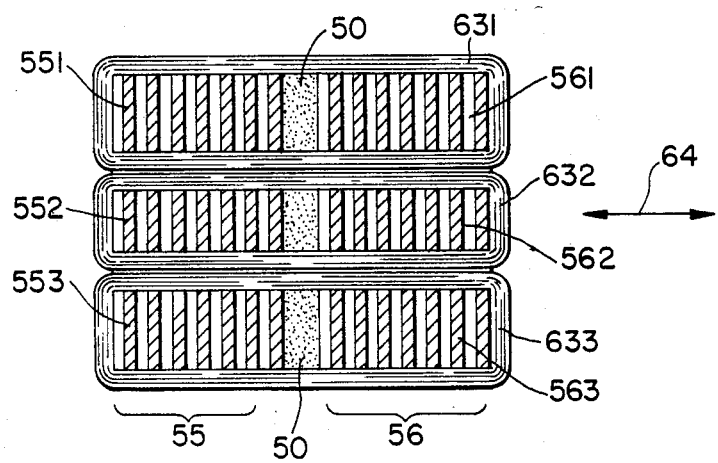
FIG. 8 is a sectional view of similar to FIG. 7C of a major part of another embodiment of the linear motor of the invention.
Figure 9A:
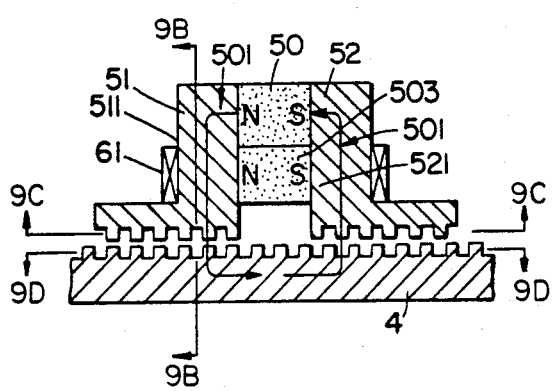
FIGS. 9A-9D, 10A-10D and 11A-11D are sectional view on lines 9A—9A to 9D—9D, 10A-10D and 11A-11D of the respective figures of further embodiments of the linear motor of the invention.
Figure 9B:
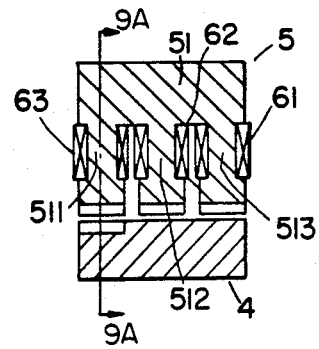
Figure 9C:
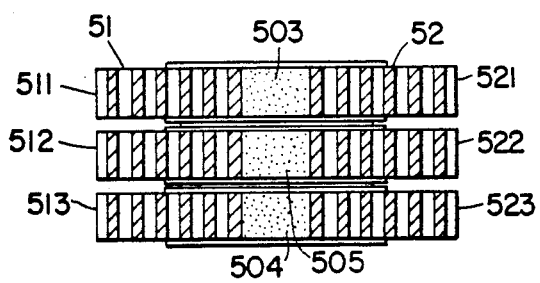
Figure 9D:
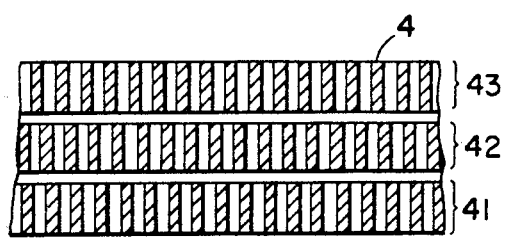
Figure 9E:
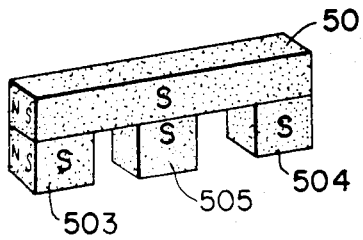
FIGS. 9E, 10E, and 11E are perspective views of parts of these embodiments.
Figure 10A:
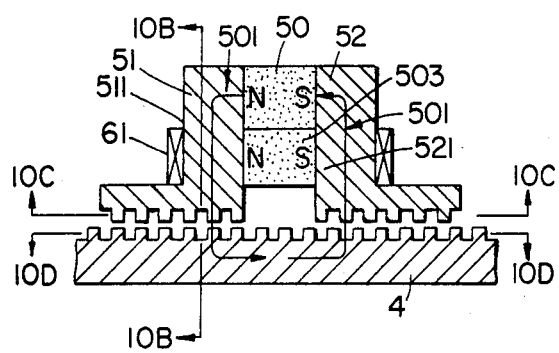
Figure 10B:
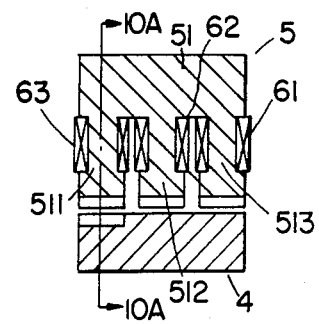
Figure 10C:
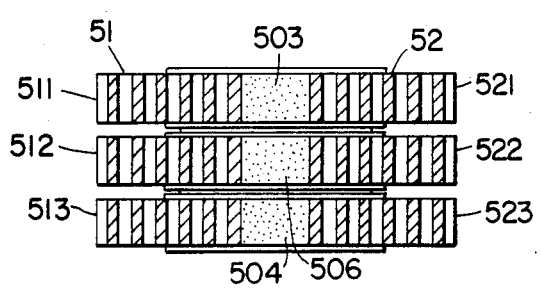
Figure 10D:
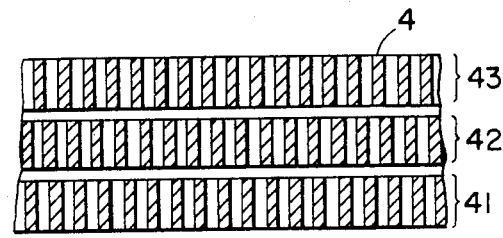
Figure 10E:
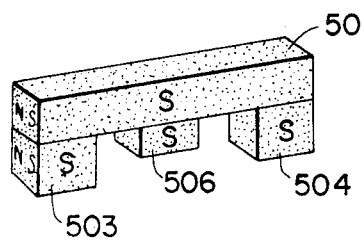
Figure 11A:
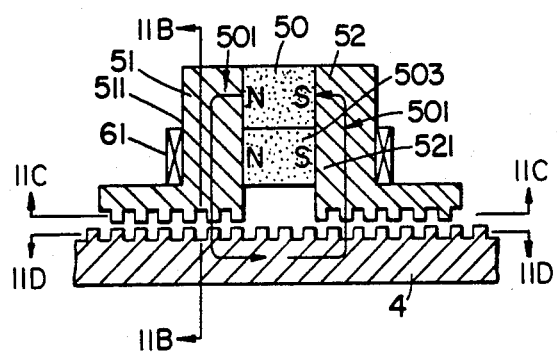
Figure 11B:
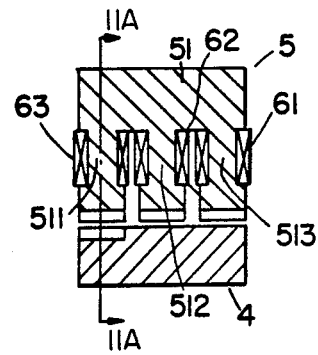
Figure 11C:
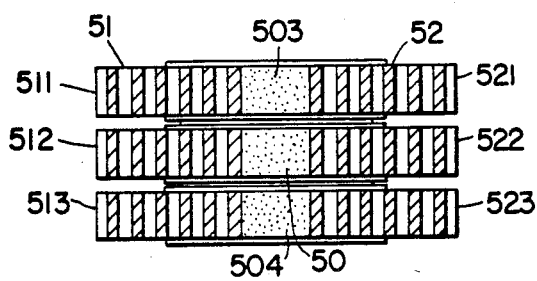
Figure 11D:
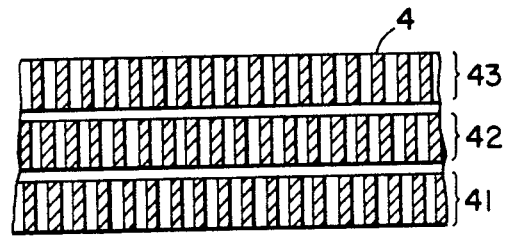
Figure 11E:
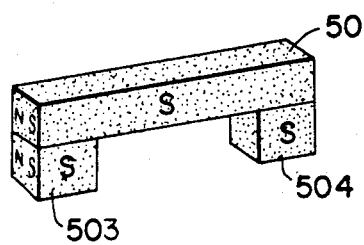

In each embodiment of the linear motor of the invention in FIG. 3, FIG. 4, FIG. 5, FIG. 7, deviation of thrust force generated in each field core, which is one of defects of prior art linear motors, does not occur. This point is explained in connection with the following embodiment. FIG. 8 is another embodiment of the linear motor of the invention. This drawing especially shows the teeth on the movable element. The embodiment in this drawing basically corresponds to the first embodiment of the invention shown in FIG. 3 (C). In Figure, the permanent magnet 50 for providing bias magnetic flux in connected between the pair of iron cores 55 and 56 and field cores, 551 and 552 and 553 and 561, 562 and 563 are on the iron cores 55 and 56 and have teeth on the surfaces facing the guiding member (not shown). Coils 631, 632 and 633 are wound around corresponding pairs of field coils. The arrow 64 shows the direction of movement of the movable element. As this Fig. shows, field cores 551 and 553 and 561 and 563, which are the outside cores laterally outside the central field cores 552 and 562 have a larger surface area of the teeth than the central field cores. In this case, transverse length of the teeth of the outside field cores, has been made greater than that of the teeth on the central field cores, and it has consequently increased the area of the teeth. The areas of the teeth on the guiding member are similarly enlarged. In this construction, reluctance of the gap is reduced, more bias magnetic flux can be induced and it becomes possible to compensate for leakage; thus an even thrust force can be realized as a result. In the embodiment, the area of the teeth part is changed by changing the length of the teeth in the transverse direction, and thus, the thrust force of each field core can be equalized quite precisely. Also, of course, the same effect can be achieved by changing the area of the teeth by changing the number of teeth and keeping the same length of the teeth. However, adjustment is not so precise as for former case.

In embodiments other than embodiment in FIG. 8, it is also good to provide the largest area for the most outside field core teeth where there are as many as four or five cores on the pair of iron cores. FIG. 9, FIG. 10 and FIG. 11 show further embodiments of the linear motor of the invention. In these embodiments, the component elements of the linear motor other than the permanent magnet means are the same as in the first embodiment of the invention shown if FIG. 3 and are given the same numbers and a detailed explanation of these parts is omitted.

Firstly, in the embodiment of FIG. 9 the permanent magnet means of movable element 5 has permanent magnet 50 which is connected between the pair of iron cores 51 and 52 to provide bias magnetic flux, and permanenet magnets 503, 504 and 505 which are positioned between corresponding field cores on iron cores 51 and 52. Said permanent magnets 503, 504 and 505 have the same dimensions. The direction of their magnetizing is adjusted to that of permanent magnet 50 as shown in FIG. 5E so that magnetic flux generated in permanent magnet 50 and passing through the fleld cores does not leak from field core 511 to field core 521, from field core 512 to field core 522, or from field 513 to field core 523. A part of the magnetic flux generated in further permanent magnets 503, 504 and 505 becomes bias magnet flux for the linear motor and it also increases the total amount of magnetic flux.

As the above description shows, the effect of permanent magnets 503, 504 and 505 helps the thrust force in multiple ways and thrust force can be increased by about 30% according to a model made by the inventor. That is, a linear motor with larger thrust force than that of prior art motors can be easily obtained without changing its external dimensions at all. In the embodiment of FIG. 10, permanent magnets 50, 503 and 504 correspond to permanent magnets 50, 503 and 504 in FIG. 9 and magnets 503 and 504 have the same dimensions. The size of permanent magnet 506 is smaller than that of permanent magnets 503 and 504 and it corresponds to permanent magnet 505 in FIG. 9. These permanent magnets 503, 504 and 506 can reduce the leakage of magnetic flux between adjacent fields cores on the adjacent iron cores just as in the embodiment of FIG. 9. Also, the linear motor thrust force is increased by increasing the total amount of bias magnetic flux and extending the effective area of the permanent magnet means. In addition to that, in the embodiment of FIG. 10, the amount of bias magnetic flux which passes across the teeth on the central fields cores is adjusted by designing the size of permanent magnet 506 positioned between central field core parts so as to adjust the thrust force generated in this part. By this measure, the thrust force generated in the group of teeth on each field core can he balanced and a high grade linear motor can be obtained. In the embodiment of FIG. 11, permanent magnets 50, 503 and 504 correspond to magnets 50, 503 and 504 in FIG. 9, and magnets 503 and 504 have the same size. The permanent magnet which corresponds to 505 in FIG. 9 is excluded. This is an extreme case of FIG. 10 in which the dimensions of permanent magnets 503 and 504 are designed to maintain the balance of thrust force like the embodiment in FIG. 10 and thus, a very high grade linear motor can be realized.

As explained, the linear motor of the invention has superior features in that the balance of thrust force can be maintained between each group of teeth while increasing thrust force at the same time, as compared with prior art motors. A small linear motor with a large thrust force and having a high quality can be easily obtained without giving up the advantages of prior art motors. In the embodiments of the linear motors of the invention as shown in FIG. 9, FIG. 10 and FIG. 11, the trunk part of adjacent iron cores and the permanent magnets are made of different materials, but there is no effect on the characteristics even if they are unified in various forms. All the permanent magnets in FIGS. 9-11 are rectangular bodies, but it is not necessary to limit their form to rectangular bodies and they can be designed at will according to the shape of the iron cores and field cores within the scope of the invention.

What is claimed is:

1. A linear motor comprising:
    a stationary guiding member extending in a longitudinal direction and having a plurality of transversely spaced rows of teeth of magnetic material, said teeth being at a constant pitch P in said longitudinal direction; and
    a movable element in spaced opposed relation to said guiding member with a small gap between said movable element and said guiding member, and said movable element being movable along said guiding member;
    said movable member having:
    a pair of iron cores spaced from each other in said longitudinal direction;
    means connected between said iron cores for supplying bias magnetic flux to said pair of iron cores; and
    means electrically associated with said iron cores for energizing said pair of iron cores;
    each of said pair of iron cores having a plurality of field cores respectively facing corresponding rows of said plurality of transversely spaced rows of teeth on said guiding member, each of said field cores having teeth on the surface facing said guiding member spaced in said longitudinal direction at the same pitch P as that of said teeth in said rows on said guiding member, said teeth on each of said plurality of field cores on each of said pair of iron cores being aligned in a direction transverse to said guiding member with the teeth on the other field cores on the iron core, and the teeth on the field cores on one of the pair of iron cores being offset from the teeth on the field cores of the other of said pair of iron cores by a distance of ½P in said longitudinal direction; and
    said teeth in each of said plurality of rows of teeth on said guiding member being offset in the longitudinal direction a distance n/m·P from the teeth in adjacent rows, m being the number of phases of said linear motor and n being an integer, and m>n.

2. The linear motor as claimed in claim 1 wherein said guiding member comprises a substrate made of a magnetic material and a laminate of magnetic material on the surface of said substrate facing said movable member and having a plurality of slits therein defining said plurality of teeth therebetween.

3. The linear motor as claimed in claim 1, wherein the number of said field cores on each of said pair of iron cores in 2m−j, where j is an integer satisfying the formula m−2≧j≧0.

4. The linear motor as claimed in claim 1, wherein some of said plurality of field cores on each of said pair of iron cores each has an area $S_1$ and the remainder of said plurality of field cores on each of said pair of iron cores each has an area $S_2$, the relationship between $S_1$ and $S_2$ being $S_2 = 2S_1$.

5. The linear motor as claimed in claim 4, wherein said field cores having the area $S_2$ are located at the centers of each of said pair of iron cores.

6. The linear motor as claimed in claim 1, wherein said means for supplying bias magnetic flux is a permanent magnet means connected between said pair of iron cores.

7. The linear motor as claimed in claim 6, wherein said permanent magnet means is a single permanent magnet.

8. The linear motor as claimed in claim 6, wherein said permanent magnet means is an assembly of a plurality of permanent magnets corresponding to said plurality of field cores on each of said pair of iron cores.

9. The linear motor as claimed in claim 8, wherein said plurality of permanent magnets positioned toward the sides of said movable element are larger in size than those positioned toward the center portion of said movable element.

10. The linear motor as claimed in claim 1, wherein said means for energizing said pair of iron cores comprises a plurality of coils wound around said pair of iron cores.

11. The linear motor as claimed in claim 10, wherein each of said plurality of coils is wound around one of said plurality of field cores on one of said pair of iron cores and a corresponding one of said plurality of field cores on the other of said pair of iron cores which is adjacent to said one of said plurality of field cores on said one of said pair of iron cores.

* * * * *